United States Patent [19]
Chan et al.

[11] Patent Number: 5,951,687
[45] Date of Patent: Sep. 14, 1999

[54] STORAGE DISC WITH SELF DIAGNOSTICS AND CONFIGURATION

[75] Inventors: Wing Hung Chan; Yong Peng Chng, both of Singapore, Singapore

[73] Assignee: Seagate Technology, Inc., Scotts Valley, Calif.

[21] Appl. No.: 08/866,530

[22] Filed: May 30, 1997

Related U.S. Application Data

[60] Provisional application No. 60/036,996, Jan. 31, 1997.

[51] Int. Cl.⁶ .................................................... G06F 11/00
[52] U.S. Cl. ............................................. 713/2; 713/100
[58] Field of Search .................................. 395/651, 652, 395/856, 700, 183.01; 713/21, 100; 710/36; 714/25

[56] References Cited

U.S. PATENT DOCUMENTS

| | | |
|---|---|---|
| 4,419,701 | 12/1983 | Harrison et al. ........................ 360/77 |
| 4,679,102 | 7/1987 | Wevers et al. ........................ 360/75 |
| 5,473,484 | 12/1995 | Dunfield et al. ..................... 360/99.08 |
| 5,600,511 | 2/1997 | Dunfield et al. ..................... 360/97.02 |
| 5,659,680 | 8/1997 | Cunningham et al. ............ 395/183.01 |

*Primary Examiner*—Joseph E. Palys
*Assistant Examiner*—Omar A. Omar
*Attorney, Agent, or Firm*—Westman, Champlin & Kelly, P.A.

[57] ABSTRACT

A storage device for use with a computer is provided, the device includes self diagnostics and configuration. The device is adapted to recognize when the host computer system requests an operating system from the device, and instead of providing the operating system, provides its own diagnostic and configuration software. When the software executes on the computer, the software causes a user interface to be generated, which provides various configuration and diagnostic options to a user. Upon termination of the self diagnostic and configuration software, the device provides the operating system to the computer such that the start up sequence is resumed.

16 Claims, 11 Drawing Sheets

Fig. 9

| # | Setting | Value | # | Setting | Value |
|---|---------|-------|---|---------|-------|
| 1) | Hard reset equal soft | OFF | 17) | Read Ahead enable | ON |
| 2) | 4-Byte ECC | OFF | 18) | Read Caching enable | ON |
| 3) | Keep DMA mode across rst | OFF | 19) | Coretest mode enable | ON |
| 4) | Intersector Delay (us) | 0 | 20) | Read Sequential enable | ON |
| 5) | Keep mult mode across rst | ON | 21) | Segment Trimming enable | ON |
| 6) | Disable IORDY | OFF | 22) | Segment Expansion enable | OFF |
| 7) | S.M.A.R.T. | ON | 23) | Adaptive Seg Size enable | ON |
| 8) | Block Mode | OFF | 24) | Read Repetative enable | ON |
| 9) | Ignore slave drive command | OFF | 25) | Autoread enable | ON |
| 10) | Default to standby mode | OFF | 26) | Buffer Segmentation | ON |
| 11) | Interface Current (mA) | 0 | 27) | Starting Modification | ON |
| 12) | Disable Fast Sync mode | OFF | 28) | Reads from the write queue | ON |
| 13) | Report 4895 cyl in iddrive | OFF | 29) | Write Behind enable | ON |
| 14) | Enable EZConfig at boot | OFF | 30) | Write Sequential enable | ON |
| 15) | Read Segment Size | 37 | 31) | Allow Write Caching | OFF |
| 16) | Write Segment Size | 72 | 32) | Read Reassignment enable | ON |

ESC:EXIT   F1:HELP   ↔↕:SELECT   PU/PD:MODIFY   F10:SAVE

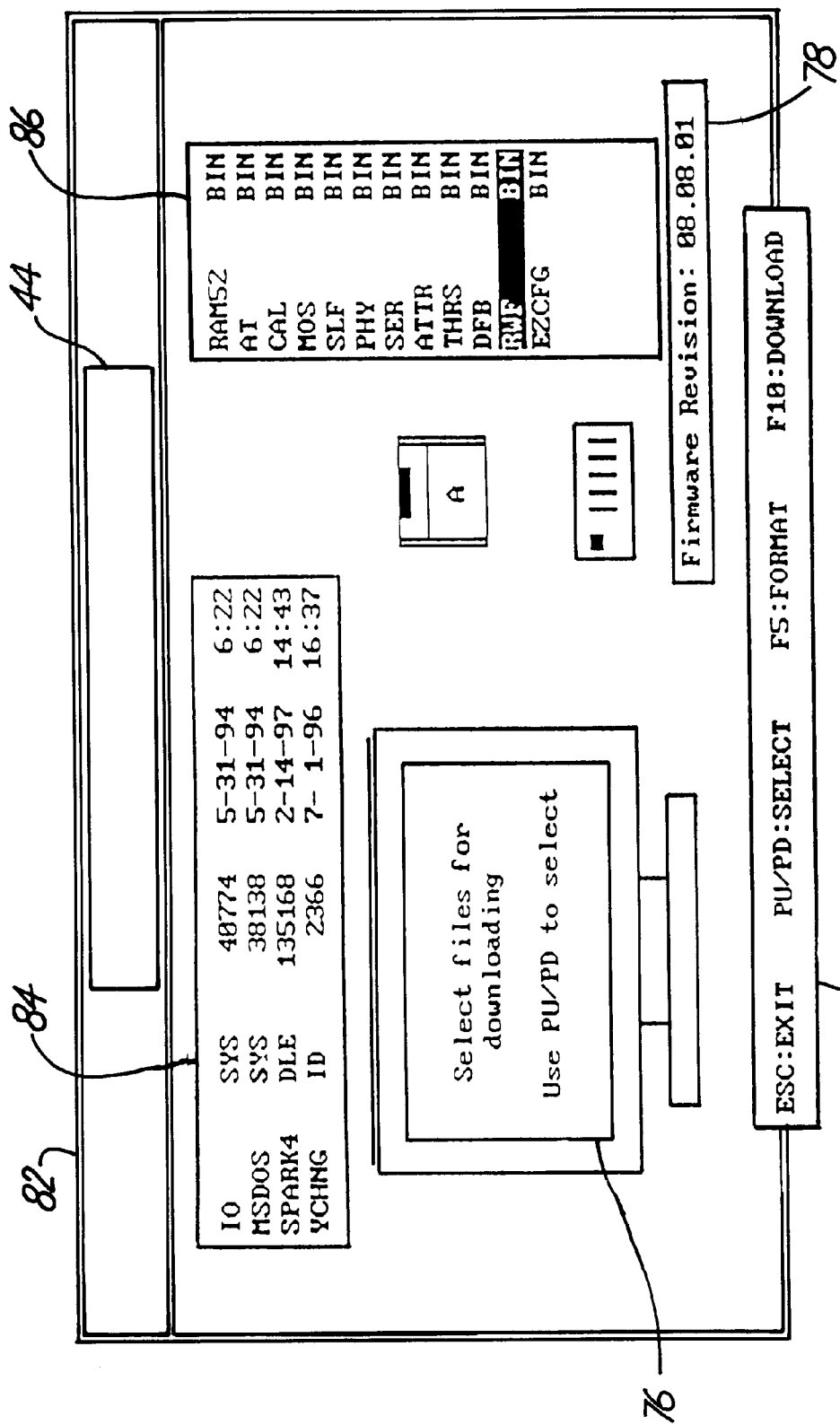

STORAGE DISC WITH SELF DIAGNOSTICS AND CONFIGURATION

BACKGROUND OF THE INVENTION

This application claims the benefit of U.S. Provisional Patent Application No. 60/036,996, filed Jan. 31, 1997.

The present invention relates generally to storage discs. More particularly, the present invention relates to a storage disc having interactive self diagnostics and self configuration capabilities.

Computers were once found only in large companies and scientific laboratories, but now they permeate daily life. Many homes and most businesses now have personal computers.

In addition to being ubiquitous, computers are becoming more powerful. The pace of computer technology is ever quickening and many computers become obsolete even while they sit on store shelves. In response to fast obsolescence, computer hardware and software manufacturers introduce "upgrades." Thus, a user is able to upgrade a portion of a computer system without discarding the entire system. Therefore, upgrading staves off obsolescence at a fraction of the cost of an entire computer system.

Increasingly, lay users of computers are upgrading various components. One such component of most computers is the storage device. These storage devices take many forms including hard-disc drives, floppy-disc drives and Compact Disc-Read Only Memory devices (CD-ROM).

Upgrading, or adding a storage device to a computer system, may be a difficult task for those not skilled in computer science and electronics. For example, when a hard disc drive is added to a system already employing a first hard disc drive, both drives generally need to be configured, such that one drive is a master and one drive is a slave. This arrangement is typically configured by setting an array of jumpers generally disposed on the hard disc drive. Thus, the original hard disc drive in a computer is configured to recognize that a second drive is now present in the system, and the new disc drive is configured to recognize that it is a slave in the system thus not providing an operating system to the computer during start up. If this arrangement is not properly effected, the entire computer system will not function. An additional limitation of this approach is that various manufacturers use varying arrays of jumpers requiring device and manufacturer specific instructions. Further, in many instances the user may have lost or thrown away the literature to the first hard drive. Today's storage devices do not provide an easy way to diagnose problems in a device added to a system not working during the "upgrade" process.

Another example of a limitation of the art is that hard disc drives may provide a vast array of features and functions that would be highly desirable to some users, but undesirable to others. However, due to the relative sophistication of the users of personal computers, hard disc drives are generally configured such that one configuration roughly fits all users.

SUMMARY OF THE INVENTION

The invention includes a storage device providing interactive self diagnostics and configuration. In accordance with one embodiment, a disc drive is provided for use with a computer, the disc drive comprises a storage disc, a spindle motor, a transducing head, an actuator, and a disc controller. The storage disc has a disc surface. The spindle motor is coupled to the disc such that the spindle motor causes the storage disc to rotate. The transducing head reads information from the surface of the disc. The actuator couples to the transducer head for responsively positioning the transducer head over the surface of the disc.

The disc controller comprises control circuitry, read circuitry, configuration memory and an I/O port. The control circuitry is coupled to the spindle of the motor and the actuator and controls the operation of the disc. The read circuitry is coupled to the transducer head and receives information from the transducer head. The configuration memory contains configuration information. The I/O port is coupled to the control circuitry and is adapted to be coupled to the computer such that information is transferred between the control circuitry and the computer. The I/O port is adapted to provide boot management software to the computer wherein the boot management software comprises program instructions suitable for execution by the computer. The program instructions contain information relating to diagnostics and configuration of the disc drive and allow the computer to communicate with the control circuitry through the I/O port.

BRIEF DESCRIPTION OF THE DRAWINGS

FIG. 9 is a front elevation view of a computer monitor displaying a fifth user interface in accordance with the present invention.

FIG. 11 is a front elevation view of a computer monitor displaying a seventh user interface in accordance with the present invention.

DETAILED DESCRIPTION OF THE PREFERRED EMBODIMENTS

Figure 1:
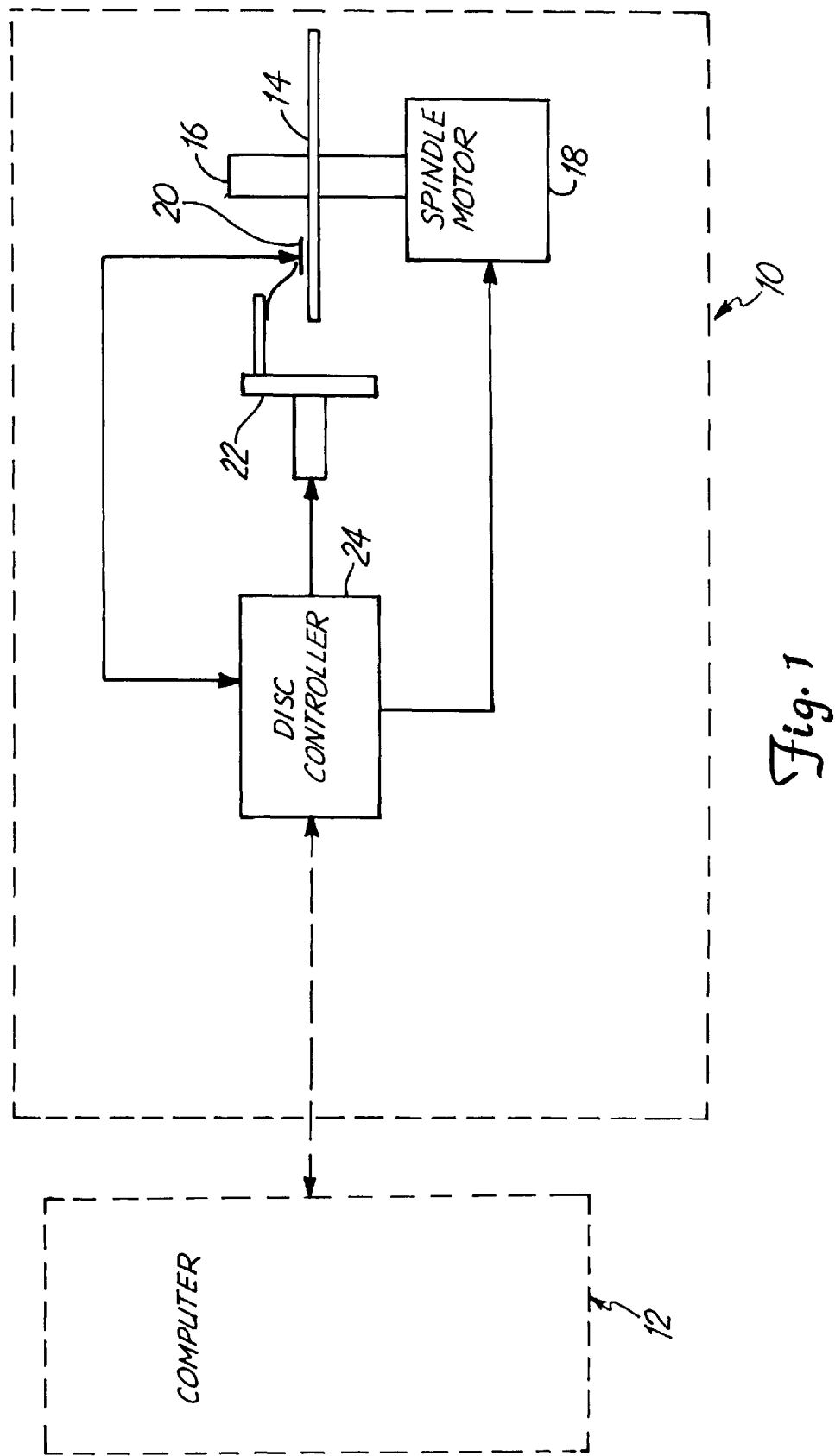
FIG. 1 is a block diagram of a storage disc in accordance with the present invention.

FIG. 1 is a block diagram of a storage disc in accordance with the present invention. FIG. 1 shows storage drive 10 coupled to computer 12 such that computer 12 transfers data to and reads data from storage drive 10. Storage drive 10 includes storage disc 14, spindle 16, spindle motor 18, transducer head 20, actuator 22, disc controller 24, read/write circuitry 26, and I/O port 28.

Disc 14 is fixedly disposed about spindle 16. Spindle 16 is coupled to spindle motor 18 such that energization of spindle motor 18 causes spindle 16 and disc 14 to rotate. When disc 14 rotates, transducer head 20 flies a slight distance above disc 14 and is magnetically or optically coupled to the surface of disc 14. Transducer head 20 is coupled to actuator 22. Actuator 22 is coupled to disc controller 24 and is adapted to move transducer head 20 across the surface of disc 14 in response to an actuation signal from disc controller 24.

Disc controller 24, in addition to being coupled to actuator 22, is coupled to spindle motor 18 and computer 12. Disc controller 24 provides the energization signal to spindle motor 18. Thus, because disc controller 24 controls actuator 22 and spindle motor 18, disc controller 24 essentially controls all motion in storage device 10. Disc controller 24 also provides information which is to be written to disc 14 to transducer head 20 and receives information which is read from disc 14 from transducer head 20.

Figure 2:
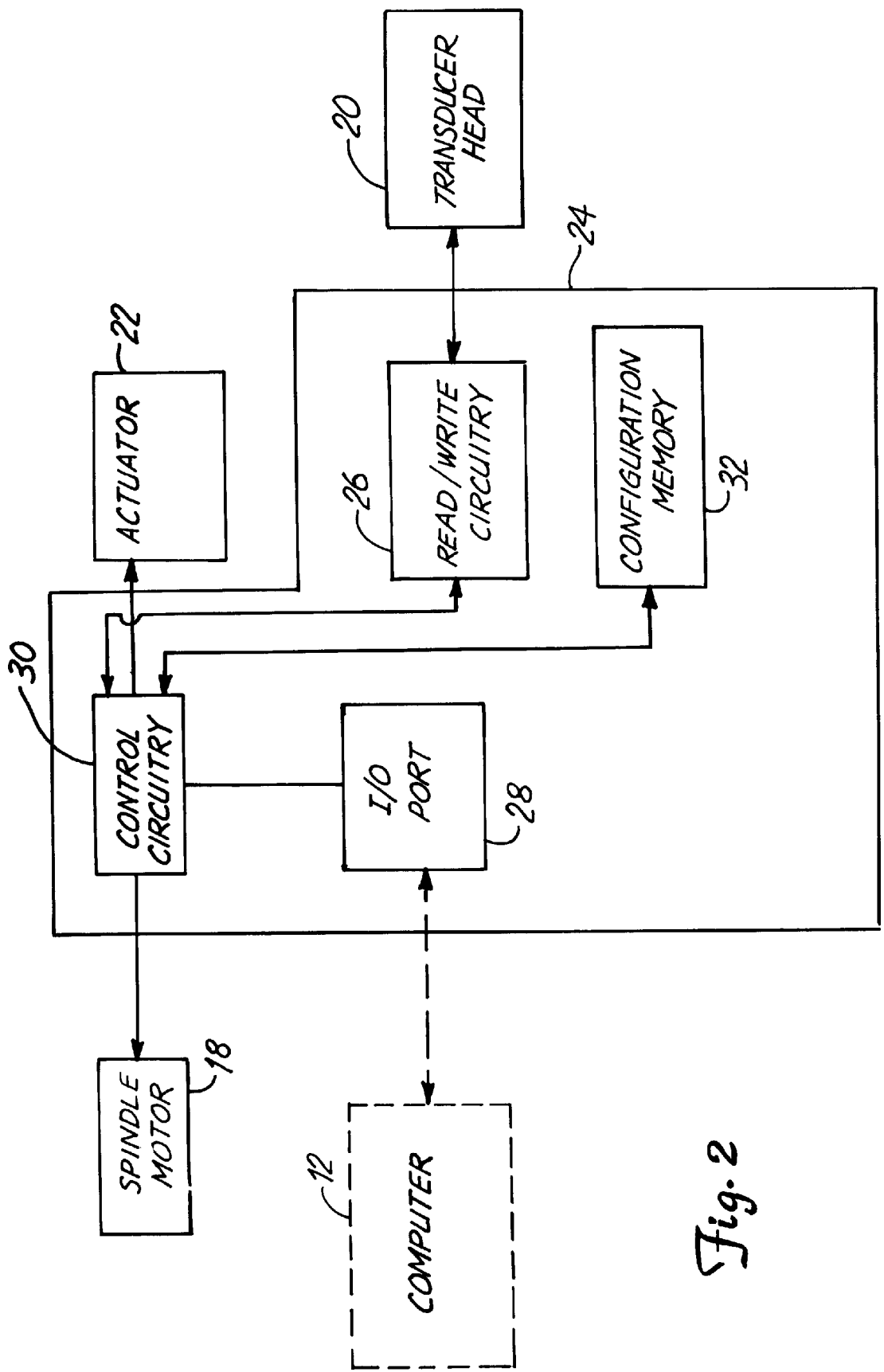
FIG. 2 is a block diagram of a disc controller in accordance with the present invention.

FIG. 2 is a block diagram of a disc controller in accordance with the present invention. FIG. 2 shows disc controller 24 coupled to computer 12, spindle motor 18, actuator 22, and transducer head 20. FIG. 2 further shows disc controller 24 comprised of read/write circuitry 26, I/O port 28, control circuitry 30 and configuration memory 32.

Control circuitry 30 is coupled to spindle motor 18, actuator 22, read/write circuitry 26, I/O port 28 and configuration memory 32. Control circuitry 30 provides the energization signal to spindle motor 18, and provides an actuation signal to actuator 22. Thus control circuitry 30 is responsible for all motion in storage device 10. Control circuitry 30 also provides information which is to be written to disc 14, to read/write circuitry 26, and receives information read from disc 14 from read/write circuitry 26. Control circuitry 30 is adapted to receive a request from I/O port 28 to read information from or write information to a specific address. Control circuitry 30 provides appropriate actuator and energization signals to position transducer head 20 over a location on disc 14 which corresponds to the selected address. Once positioned, information is written to or read from disc 14 according to the signal received from I/O port 28.

I/O port 28 is adapted to communicate commands and data between system 12 and storage drive 10.

Some commands are issued by computer system 12 during the boot sequence. One such boot command, issued by computer 12, generally instructs storage devices such as storage drive 10 to provide an operating system to computer 12. When this command is issued by computer system 12, I/O port 28 receives the command, and provides the command to control circuitry 30. Control circuitry 30 recognizes this specific command, and provides boot management software which resides in configuration memory 32 and on disc 14 to computer 12 through I/O port 28 instead of the system-requested operating system. Upon execution of the boot management software, computer system 12 causes a user interface to be displayed which provides various diagnostic and configuration functions which are specific to storage drive 10. "Diagnostics," as used herein, is intended to mean any testing relating to storage drive 10 or an interface between storage drive 10 and computer 12 regardless whether such testing is performed by storage drive 10 or computer 12. "Configuration," as used herein, is intended to mean setting or modifying any parameter of storage drive 10. Upon termination of the boot management software, control circuitry 30 provides an operating system to computer 12 through I/O port 28 much as would any prior art storage disc.

Figure 3:
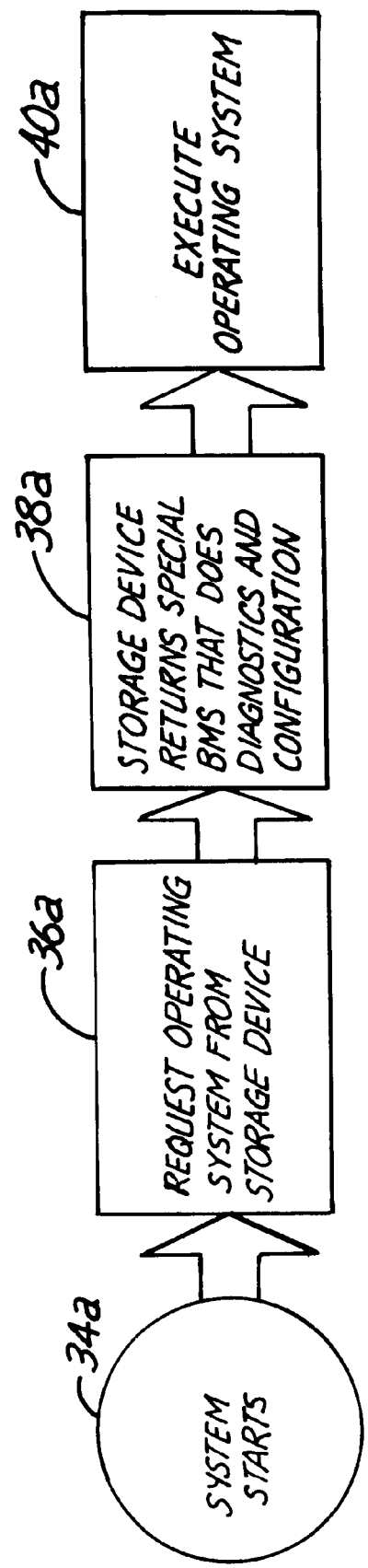
FIG. 3 is a block diagram depicting the flow of operations in a computer system employing a storage disc in accordance with the present invention.
Figure 4:
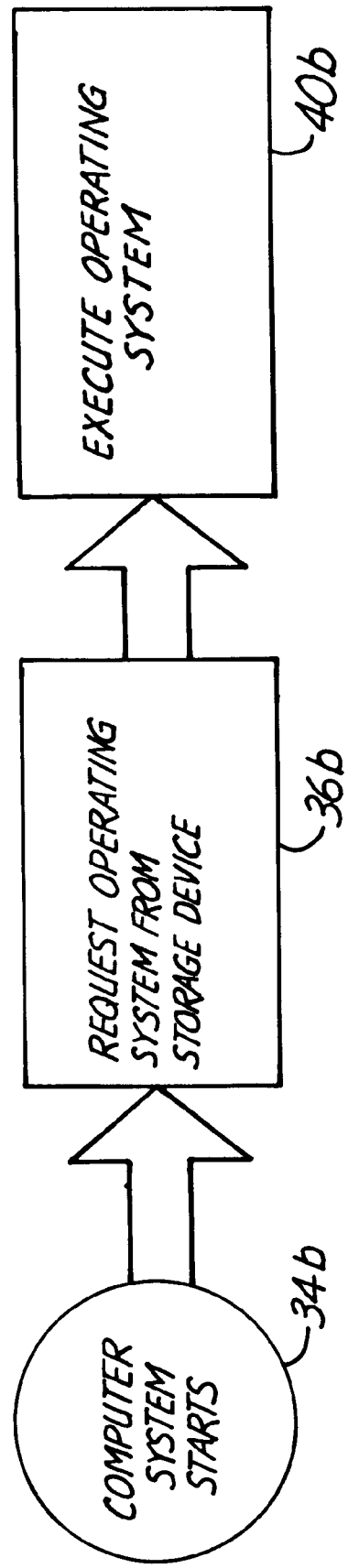
FIG. 4 is a block diagram of the flow of operations in a computer system not employing a storage disc of the present invention.

FIGS. 3 and 4 are block diagrams depicting a sequence of steps performed by a storage drive of the present invention and a prior art storage disc, respectively. Like steps are numbered similarly. Steps 34A and 34B occur when the computer system starts such as when it is first powered on, or when it is reset. During the system initialization of steps 34A and 34B, computer system 12 requests an operating system from an attached storage device such as a storage drive 10. Devices in accordance with the present invention recognize the systems request for an operating system and perform step 38A. While prior art devices do not take any special action, and merely return the requested operating system for execution on the computer. During step 38A, the storage device, in accordance with the present invention, returns boot management software to the computer in lieu of the requested operating system. The boot management software is then caused to execute on a computer system and generate a user interface on the computer which provides diagnostic end configuration functions. Upon termination of the boot management software, the storage device returns and operating system to the computer in order to resume the boot process.

Figure 5:
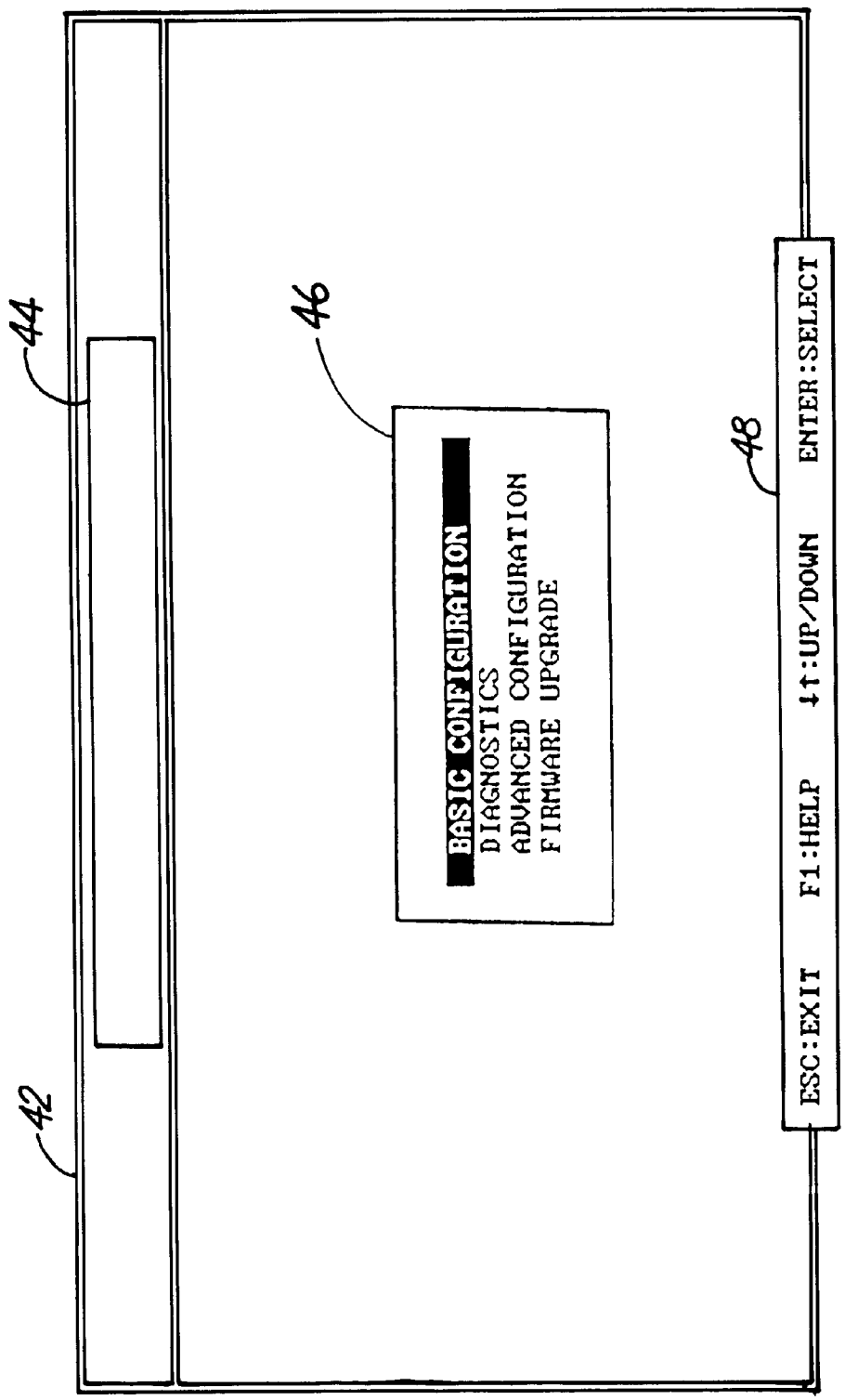
FIG. 5 is a front elevation view of a computer monitor displaying a first user interface in accordance with the present invention.

FIG. 5 is a front elevation view of a computer monitor displaying first user interface in accordance with the present invention. First user interface 42 is displayed upon execution of the boot management software by computer 12. First user interface 42 preferably includes three fields, title field 44, option field 46, and legend field 48.

Title field 44 preferably indicates the manufacturer of the storage drive 10, and preferably even includes such information as the model number of storage drive 10, and the current version of the firmware employed in storage drive 10.

Option field 46 provides a user with options for various activities that may be performed with storage drive 10. For example, such options may include, and certainly are not limited to, basic configuration, diagnostics, advanced configuration and firmware upgrades. Selection of any of the options provided by option field 46 will cause the computer running the boot software to generate successive user interfaces corresponding to the selected option. For example, basic configuration will be discussed in relation to FIG. 6; diagnostics will be discussed in relation to FIG. 7; advanced configuration will be discussed in relation to FIGS. 7 and 8; and firmware upgrades will be discussed in relation to FIGS. 10 and 11.

Legend field 48 preferably indicates which key strokes will be recognized by the computer running the boot management software, and what the function of those key strokes will be. For example, legend field 48 provides "ESC: EXIT" meaning that when the escape key of the computer is pressed, the computer will terminate execution of the boot management software and exit in order to resume the boot process.

Figure 6:
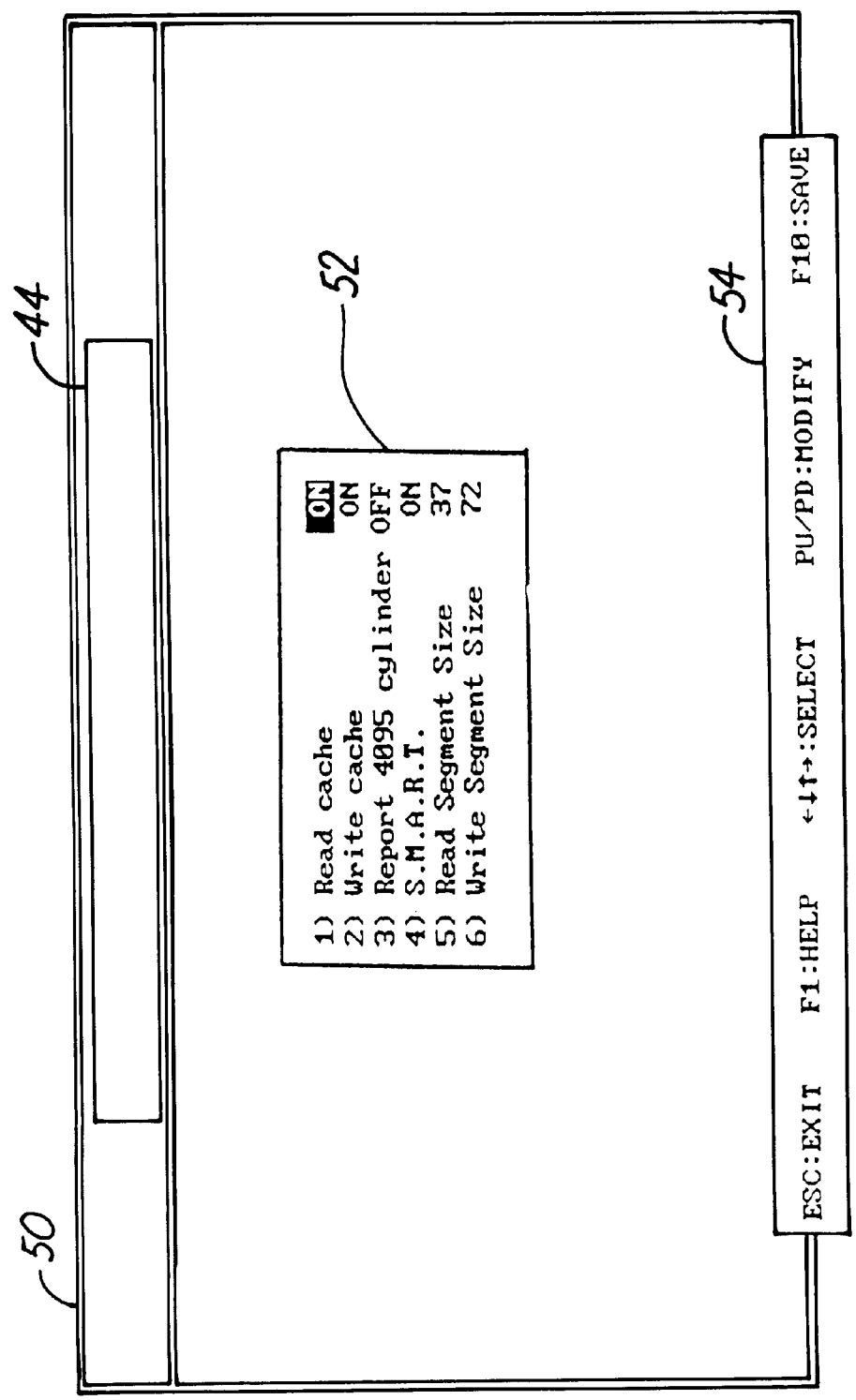
FIG. 6 is a front elevation view of a computer monitor displaying a second user interface in accordance with the present invention.

FIG. 6 is a front elevation view of a computer monitor displaying a second user interface in accordance with the present invention. Second user interface 50 is displayed by computer 12 when a user selects the "basic configuration" option from option field 46 of first user interface 42 (shown in FIG. 5). Second user interface 50 preferably includes three fields, title field 44, basic configuration field 52, and second legend field 54. Title field 44 is preferably the same title field as described with respect to FIG. 5, and thus bears the same reference numeral. Second legend field 54 is similar to first legend field 48, but provides that page up and page down keys modify basic configuration parameter values, and depressing key F10 on computer 12 will cause the basic configuration parameters to be saved to storage drive 10.

Configuration field 52 provides basic configuration options including, but not limited to, such options as: read cache enablement, write cache enablement, enablement of cylinder 4059 reporting, enablement of Self Monitoring And Reporting Technology (S.M.A.R.T.), and size configuration of both read and write segments. Upon modification of the basic configuration parameters, computer 12 stores the modified parameter value in memory until termination of boot management software when computer 12 causes the new basic configuration parameter to be provided to storage drive 10 through I/O port 28. When control circuitry 30 receives the basic configuration parameter information from I/O port 28, it stores that information in configuration memory 32 or disc 14.

Figure 7:
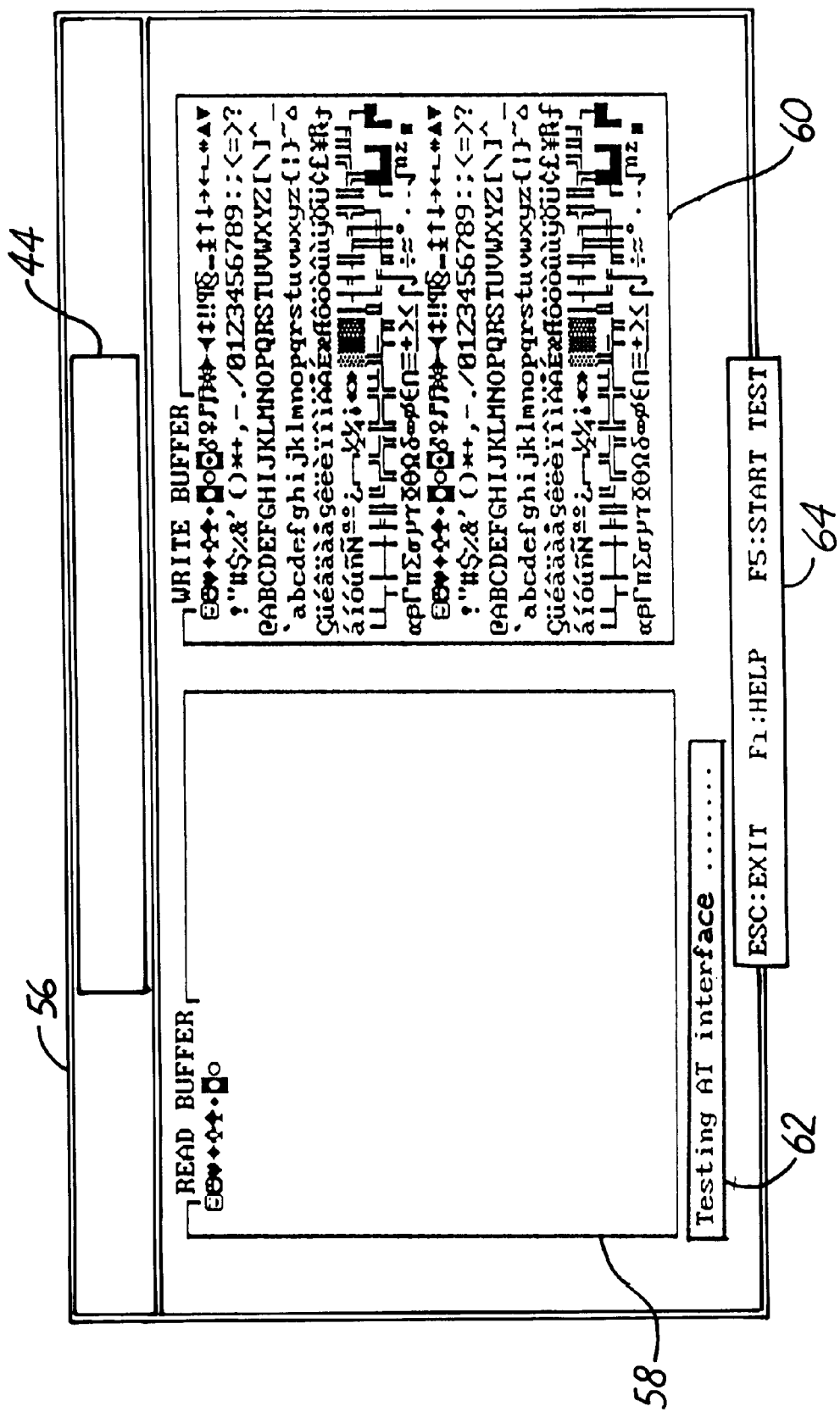
FIG. 7 is a front elevation view of a computer monitor displaying a third user interface in accordance with the present invention.

FIG. 7 is a front elevation view of a computer monitor displaying a third user interface in accordance with the present invention. Computer 12 causes third user interface 56 to be displayed when the diagnostics option is selected from option field 46 (shown in FIG. 5). Third user interface 56 preferably is comprised of five fields, title field 44, read buffer field 58, write buffer field 60, diagnostic status field 62, and third legend field 64. Title field 44 is preferably the same title field as shown in FIGS. 5 and 6 and thus bears the same reference numeral. Read buffer field 58 and write buffer field 60 provide diagnostic test results which may be compared with known, good, test results in order to effect proper diagnosis. Additionally, test status field 62 provides indications of the status of diagnosis, as the diagnosis progresses. Finally, third legend field 64 provides that upon pressing the F5 key on computer 12, diagnostics begin.

Figure 8:
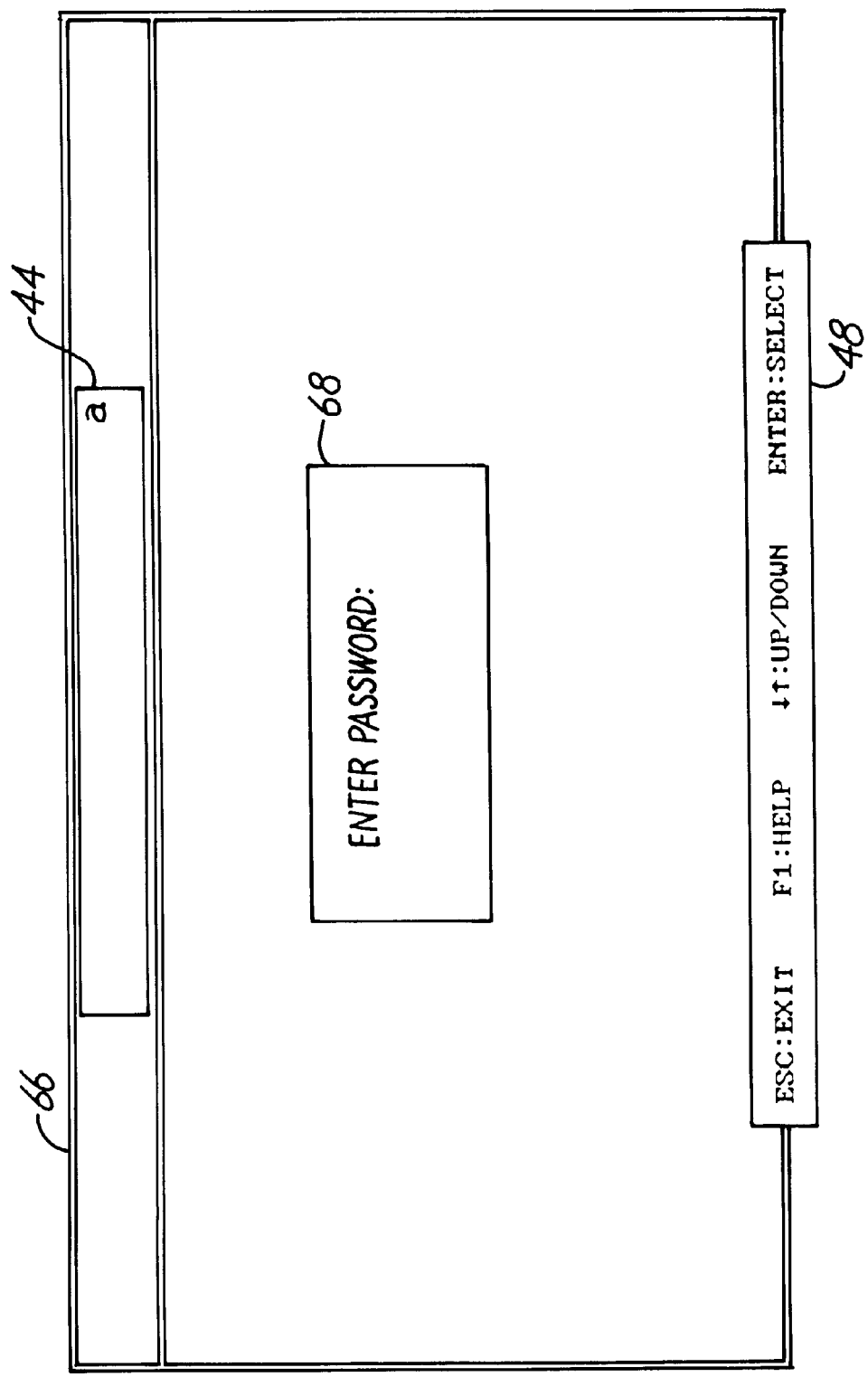
FIG. 8 is a front elevation view of a computer monitor displaying a fourth user interface in accordance with the present invention.

FIG. 8 is a front elevation view of a computer monitor displaying a fourth user interface in accordance with the present Invention. Computer 12 causes fourth user interface 66 to be displayed when the "advanced configuration" option is selected from option field 46 (shown in FIG. 5). Although, fourth user interface 66 is not required to practice the present invention, it is included in the preferred embodiments in order to restrict casual user access to higher-level, technical configuration options. When fourth user interface 66 appears on computer 12, computer 12 waits for a user to enter an appropriate password. Upon receiving the appropriate password, computer 12 causes fifth user interface 70 to be displayed. Additionally, fourth user interface 66 preferably includes title field 44 and first legend field 48.

FIG. 9 is a front elevation view of a computer monitor displaying a fifth user interface in accordance with the present invention. As stated earlier with respect to FIG. 8, computer 12 causes fifth user interface 70 to be displayed upon receiving an appropriate password through fourth user interface 66 (shown in FIG. 8). Fifth user interface 70 preferably includes three fields, title field 44, advanced configuration parameter field 72, and legend 54. Fifth user interface 70 operates in a manner similar to second user interface 50 described with respect to FIG. 6. Preferably, fifth user interface 70 includes title block 44 and legend 54.

Any parameters available ill advanced configuration parameter selection field 72, which may contain any appropriate device parameter may be selected. Such parameters include, but are not limited to, whether a hard reset shall be treated as a soft reset; whether 4-byte (ECC) is enabled; whether a DMA mode is kept across a reset; the length of an intersector delay, if any; whether multi-mode is kept across a reset; whether the IORDY signal is disabled; whether S.M.A.R.T. is enabled; whether the drive will operate in block mode; whether the drive will ignore slave drive commands; whether the drive will default to a standby mode; the level of interface current, if any; whether fast sync mode is enabled; whether the drive will report cylinder 4095 in the iddrive step; whether EasyConfig is enabled at boot; the size of both read and write segments; whether read ahead is enabled; whether read caching is enabled; whether coretest mode is enabled; whether read sequential is enabled; whether segment trimming is enabled; whether segment expansion is enabled; whether adaptive segment sizing is enabled; whether repetitive reading is enabled; whether Auto Reading is enabled; whether buffer segmentation is enabled; whether starting modification is enabled; whether reads are allowed from the write queue; whether write behind is enabled; whether write sequential is enabled; whether write caching is enabled; and whether read reassignment is enabled. Those skilled in the art will recognize the wide array of parameters that may be selected in the advanced configuration user interface. It should be recognized that any appropriate device parameter may be configured.

Figure 10:
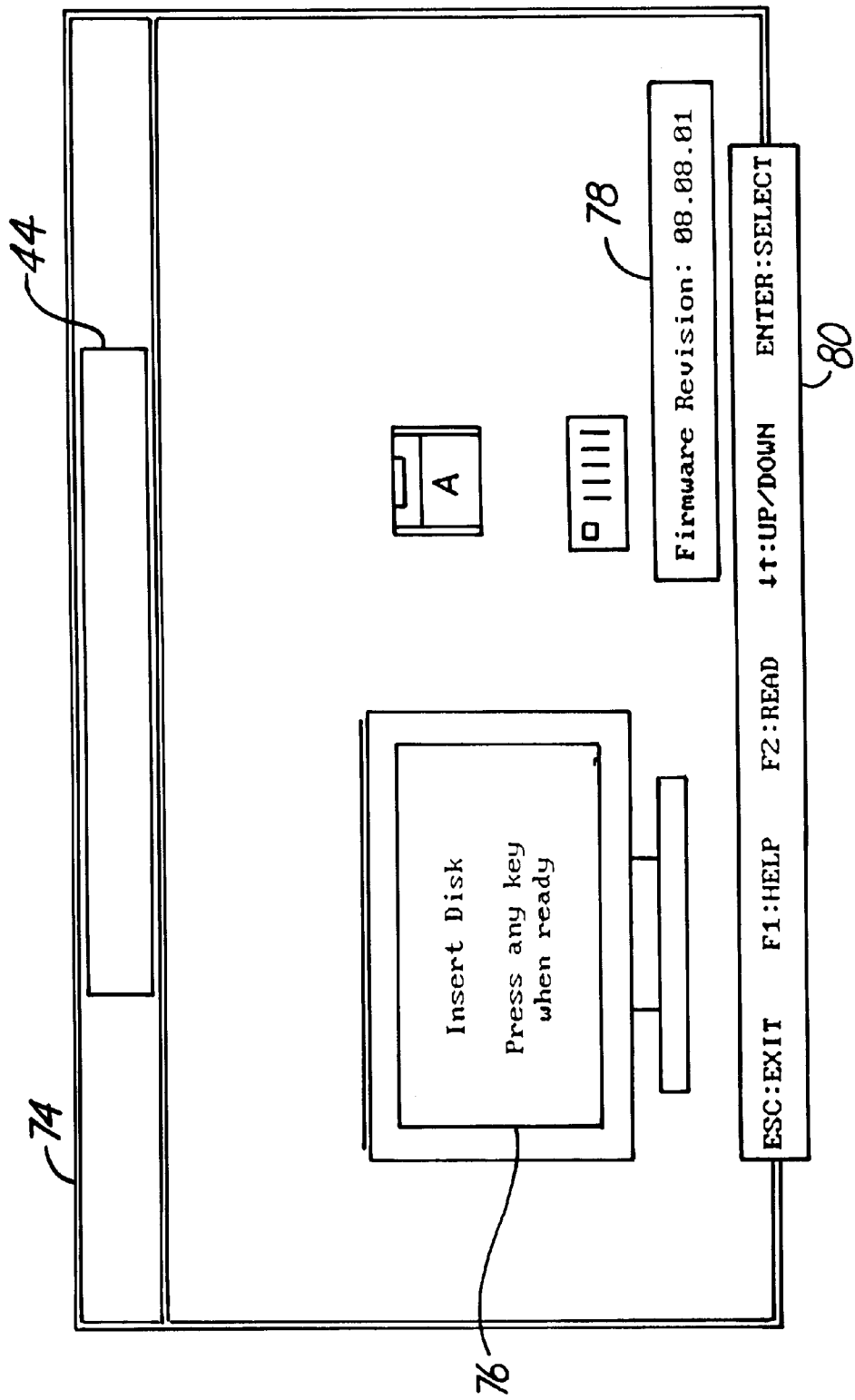
FIG. 10 is a front elevation view of a computer monitor displaying a sixth user interface in accordance with the present invention.

FIG. 10 is a front elevation view of a computer monitor displaying a sixth user interface in accordance with the present invention. Computer 12 causes sixth user interface 74 to be displayed when the "firmware upgrade" option is selected from option selection field 46 (shown in FIG. 5). Sixth user interface 74 preferably includes four fields, title field 44, instruction field 76, firmware revision field 78, and legend field 80. Sixth user interface 74 is provided to enable a user to download firmware upgrades which may become available to the user through the lifetime of the storage drive 10. Such firmware upgrades may offer enhanced device capabilities such as improved performance, compatibility and longevity. Preferably, instruction field 76 prompts a user to perform certain instructions such as inserting a firmware upgrade disc (not shown) into computer 12. Firmware revision field 78 preferably displays the current firmware revision level. Legend field 80 operates similar to previous legend fields 48, 54, 64, but adds the F2:read function. Once a user has performed the instructions requested by computer 12 and instruction field 76, computer 12 causes seventh user interface 82 to be displayed.

FIG. 11 is a front elevation view of a computer monitor displaying a seventh user interface in accordance with the present invention. Seventh user interface 82 preferably comprises title field 44, file display field 84, file selection field 86, user instruction field 76, firmware revision field 78, and legend 88. Instruction field 76 prompts a user to select files to be downloaded from file selection field 86. File selection in file selection field 86 is accomplished in much the same manner that options are selected from option field 46. Preferably, files residing in device firmware are displayed in file display field 84. Additionally, as described with respect to FIG. 10, firmware revision field 78 displays the firmware revision of drive 10. Legend field 88 is similar to previous legend fields but offers additional key-function instructions. For example, pressing key F5 in the seventh user interface causes the computer to execute a format command, and pressing key F10 causes computer 12 to download files selected by file selection field 86 to storage drive 10.

In another embodiment, similar user interfaces may be used to allow a user to select one of a plurality of operating systems. For example, computer 12 executing boot management software may cause storage drive 10 to search portions of disc 14 to determine if disc 14 contains multiple operating systems. If multiple operating systems are found by storage drive 10 on disc 14, then computer 12 would provide an additional option on a first user interface. The additional option is to the effect of "operating system select". Upon choosing the "operating system select" option, computer 12 causes a second user interface to be displayed which provides a list of available operating systems for user selection. When an operating system is selected, and the boot management software terminates storage drive 10 causes the user-selected operating system to be provided to computer 12 for execution.

Finally, it has been found that using a single jumper on storage disc 10 to enable or disable the transfer of boot management software from storage drive 10 to computer 12 is preferable. Thus, when the jumper is in a disabled position, storage drive 10 in accordance with the present invention, behaves like a prior art storage disc. However, when the jumper is in an enabled position storage drive 10 intercepts the boot sequence of computer 12 as described previously in accordance with the present invention.

It can be appreciated that the present invention significantly advances the art of storage devices by providing simpler user access to a wider array of device characteristics. With this invention, the boot management system bridges the technological gap between relatively unsophisticated users and high-level technical features available in storage devices. The present invention effects this advance with minimal increase in complexity of the device itself. In fact, it is believed that the present invention can be practiced with little, if any additional costs over devices of the prior art. Further, the boot management system of the present invention does not remain resident in the computer, and thus will not decrease system performance.

Prior to this invention, a diskette with configuration program was typically shipped with the storage device. The configuration program inside the diskette achieves similar functions. With this invention, such diskettes are not needed because the configuration and diagnostics functionality are integrated inside the drive. It can be appreciated that to implement all these options from FIGS. 5 to 11 by jumpers is not feasible due to the large number of jumpers.

Although the present invention has been described with reference to preferred embodiments, workers skilled in the art will recognize that changes may be made in form and detail without departing from the spirit and scope of the invention. For example, although the present invention has been described with respect to interactive configuration with a user, such configuration could also be accomplished via interaction with a Read Only Memory (ROM) in the computer. Further, although the present invention has been described with respect to menu-type user interfaces, such user interfaces could be adapted to ask specific questions to a user such as the type of use to which the computer is put. Additionally, although the present invention has been described as acting within the boot sequence of the computer, it is conceivable that the configuration and diagnostics could be forced with software anytime during operation of the computer. Finally, although the present invention has been described with respect to an enablement jumper, any other appropriate switch may be used including a software type switch "Press [F1] for hard drive configuration."

What is claimed is:

1. A storage device for use with a computer having a user interface, the storage device comprising:
    a storage disc having a disc surface;
    a spindle motor coupled to the disc for causing rotation of the disc;
    a transducing head for reading information from the surface of the disc;
    an actuator coupled to the transducer head responsively positioning the transducer head over the surface of the disc;
    a disc controller comprising:
        control circuitry coupled to the spindle motor and the actuator and controlling operation of the disc in response to configuration information;
        read circuitry coupled to the transducer head receiving information from the transducer head;
        a configuration memory containing configuration information for use by the control circuitry;
        an I/O port coupled to the control circuitry, and adapted to be coupled to the computer whereby information is transferred between the control circuitry and the computer, to thereby provide boot management software to the computer, wherein the boot management software comprises:
            program instructions for execution by the computer, the instructions relating to diagnostics and configuration of the storage device through the user interface and wherein the computer provides the configuration information to the control circuitry through the I/O port.

2. The device of claim 1 wherein the boot management software is stored in the configuration memory.

3. The device of claim 1 wherein the boot management software is stored on the disc.

4. The device of claim 1 wherein the programming instructions instruct the computer to diagnose communication between the device and the computer.

5. The device of claim 1 wherein the program instructions further comprise user interface instructions causing the computer to display a device configuration parameter through a user interface and to provide a user input to the disc controller.

6. The device of claim 5 wherein the configuration parameter is one of a read parameter, a write parameter, an interface parameter and a reset behavior parameter.

7. The device of claim 6 wherein the read parameter is one of read cache enablement and read segment size.

8. The device of claim 6 wherein the write parameter is one of write cache enablement and write segment size.

9. The device of claim 1 wherein the programming instructions instruct the computer to diagnose a plurality of hardware components comprising the storage device.

10. The device of claim 1 wherein the program instructions include:
    operating system data corresponding to a plurality of operating systems stored on the storage device and executable on the computer;
    user interface instructions for execution on the computer, the user interface instructions causing the computer to display the operating system data and to provide a user-selected input corresponding to one of the plurality of operating systems to the disc controller; and
    wherein the disc controller provides an operating system, based on the user-selected input, to the computer for execution upon termination of the boot management software.

11. The device of claim 1 further comprising a boot management enabling jumper for enabling transfer of the boot management software to the computer when the jumper is in a first condition, and disabling transfer of the boot management software to the computer when the jumper is in a second condition.

12. A method of configuring a storage device in a computer comprising the steps of:

receiving, in the storage device, a request from the computer for the storage device to provide an operating system to the computer;

responding to the request of the computer by providing a boot management system instead of the requested operating system;

executing the boot management system on the computer;

creating a user interface on the computer which displays configuration information and allows modification thereto; and upon termination of the boot management system, the storage device storing configuration changes and providing the operating system to the computer such that the operating system is executed on the computer.

13. The method as recited in claim 12 wherein the user interface provides user access to basic configuration information, but restricts access to technical configuration information unless a proper password is received.

14. The method as recited in claim 13 wherein the basic configuration information includes read and write cache enablement.

15. The method as recited in claim 14 wherein the basic configuration information further includes sizes of read and write caches.

16. A method of diagnosing a storage device in a computer comprising the steps of:

receiving, in the storage device, a request from the computer for the storage device to provide an operating system to the computer;

responding to the request of the computer by providing a boot management system instead of the requested operating system;

executing the boot management system on the computer;

creating a user interface on the computer which selectively provides device diagnostics; and upon termination of the boot management system, the storage device providing the operating system to the computer such that the operating system executes on the computer.

* * * * *